May 26, 1936.  C. FISCHER  2,041,749
GREASE GUN RACK
Filed Nov. 22, 1935
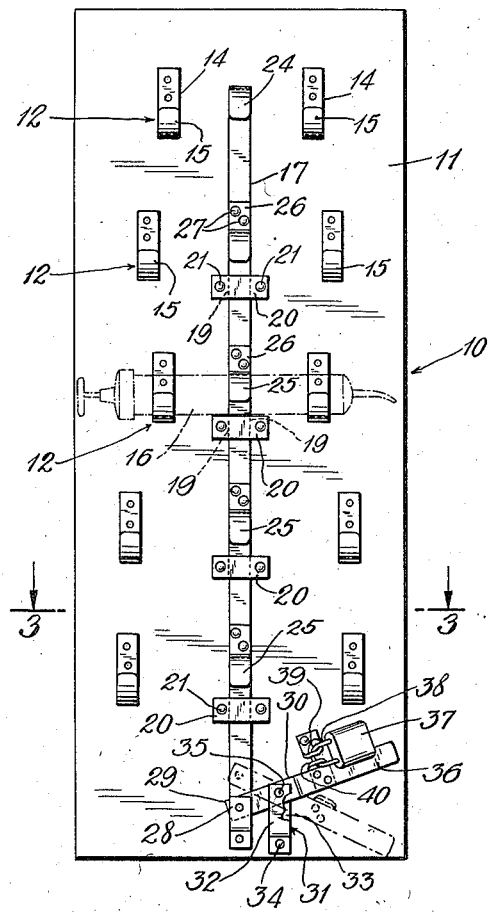
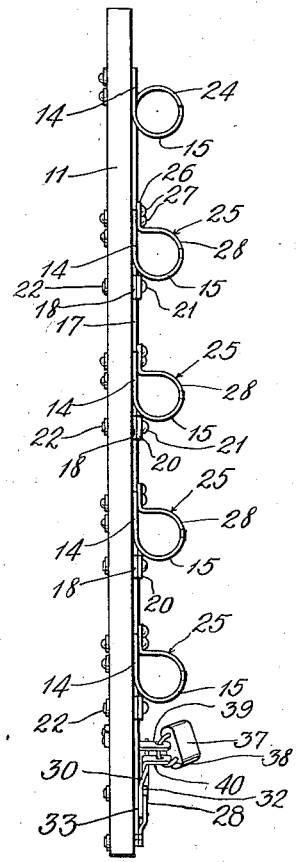
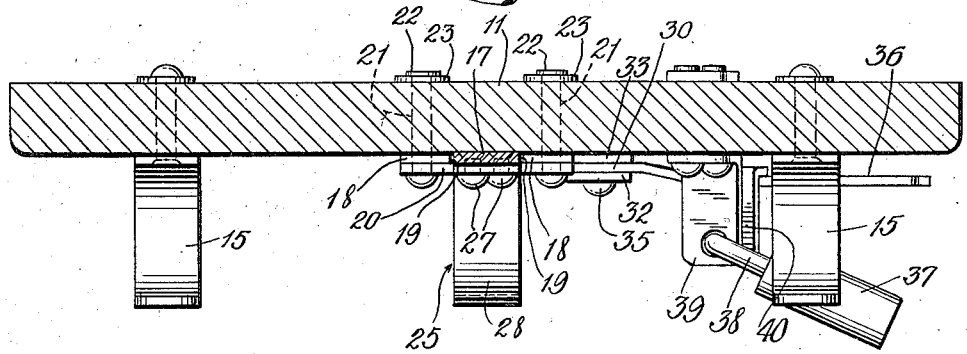
INVENTOR
Carl Fischer
BY
ATTORNEY Patented May 26, 1936

2,041,749

UNITED STATES PATENT OFFICE 2,041,749

GREASE GUN RACK

Carl Fischer, Brooklyn, N. Y., assignor of one-third to Abe Vogel and one-third to Hyman Zitterbaum, both of Brooklyn, N. Y.

Application November 22, 1935, Serial No. 51,015

6 Claims. (Cl. 211—8)

The present invention is concerned with an improved support and in particular relates to a rack for removably holding a plurality of grease guns. The invention has as an object the provision of a functionally and structurally improved rack of the type which may be conveniently mounted on a wall and which comprises a panel having spaced complementary hooks adapted to sustain a grease gun. The invention has as a further object the provision of a grease gun rack in which a unitary vertically movable member is provided with spaced locking means cooperating with complementary and horizontally alined hooks to prevent unauthorized removal of a grease gun carried thereby. The invention further contemplates the provision of a novel grease gun rack applicable for storing and locking one or more grease guns preferably of cylindrical contour and embodying a plurality of rows of spaced hooks whereby each row is adapted to support the ends of a grease gun, and means for simultaneously clamping the several grease guns supported on the several rows comprising a plurality spaced curved arms carried by a vertically disposed bar slidable relative to the panel carrying the several rows of hooks and adapted to be actuated by conveniently arranged readily accessible pivoted means. The invention further comprehends the provision of a grease gun rack provided with several rows or pairs of spaced and alined hooks adapted to sustain the ends of a grease gun to hold the latter horizontally and a vertical and unitary bar mounted flatwise adjacent said panel and slidably displaceable relative thereto comprising several arcuate arms common to the several rows and interposed between the hooks of the several pairs or rows, the several arcuate arms on downward displacement of the bar adapted to simultaneously clamp the several grease guns carried by the plurality of pairs of hooks, the several arcuate arms on vertical upward displacement of the bar adapted to simultaneously free the several supported grease guns to permit their selective removal from the rack, the bar having a pivoted connection with a manipulatable lever for displacing thereof relative to the panel, and locking means to prevent actuation of bar.

The invention consists in certain new and original features of construction and combination of parts hereinafter set forth and as to the other objects and advantages, the mode of operation and manner of its organization, these, inter alia, may be better understood by referring to the following description considered in connection with the accompanying drawing forming a part thereof in which:

Fig. 1 is a front elevational view of the grease gun rack according to my invention.

Fig. 2 is a side view thereof and

Fig. 3 is a sectional view along the line 3—3 of Fig. 1 on a larger scale.

According to the invention, the grease gun rack 10 comprises, a rectangularly shaped panel 11 having several rows of hooks, each row being generally indicated 12 and comprises a pair of horizontally alined and spaced hooks 14, each appropriately immovably fastened to the panel 11, it being noted that the lower portion of each hook of the several rows takes the form of a forwardly projecting arm 15 having a substantially semi-circular configuration facing upwardly. More particularly, however, the arcuate arms of each row are disposed in horizontal alinement for removably supporting the opposing ends of a grease gun generally denoted 16.

Interposed between the pair of curved arms of the several vertically spaced rows of hooks is a centrally arranged vertically and slidably guided rectangularly shaped unitary bar 17 common to the several hooks of the plurality of rows. In a specific aspect, however, bar 17 is slidably guided between and straddled by several pairs of rectangularly shaped blocks 18. Each pair of blocks forms a gap 19 closely but slidably confining bar 17, the gaps of the several pairs of blocks being in vertical alinement or registration while the rear face of the bar is held flatwise relative to the front wall of the panel and the bar is prevented from transverse displacement in respect to the panel by relatively elongated rectangularly shaped braces 20, there being an abutting brace for each pair of spaced blocks while suitable rivets 21 appropriately hold a brace flatwise relative to its companion blocks 18 and the latter against the panel, each of the rivets being suitably upset to form a head 22 bearing against a collar or washer 23 for holding a respective block and brace in parallel and together and the block against the panel.

For clamping the several grease guns mounted on the several rows of hooks, the upper terminal of bar 12 is provided with a semi-circularly curved downwardly facing complementary clamping arm 24 adapted to cooperate with the body of a grease gun carried by the upper pair of hooks to prevent removal of the grease gun supported thereon after the bar has been displaced downwardly.

Slidably guided bar 17 is also provided with a plurality and vertically spaced curved complementary clamping arms generally designated 25 cooperating with companion horizontally alined pairs of hooks to clamp the several grease guns carried thereby. Specifically, however, each curved arm 25 comprises a vertical lug 26 secured to bar 17 by rivets 27 and a forwardly extending and downwardly curved terminal 28 cooperating to frictionally clamp a grease gun sustained by a companion pair of hooks, the several curved arms 25 being simultaneously moved in accordance with the vertical displacement of bar 17.

The lower portion of bar 17 carries an offset lug 28, forming therewith a yoke in which one end 29 of an offset lever 30 is pivoted. The lever 30 has its intermediate portion interposed between a yoke 31 defined by an offset lug 32 and a rectilinearly shaped lug 33 having their lower ends secured together and appropriately fastened to the panel by a rivet 34.

Lugs 32 and 33 straddle the rectangularly shaped lever 30 and carry fulcrum pin 35 which is fastened to the panel and on which the intermediate portion of lever 30 is pivoted, the terminal portion 36 of the latter being out of alinement or offset with the pivoted intermediate part thereof serving as a manipulating terminal for tilting lever 30 relative to the panel for actuating bar 17.

With the manipulating portion 36 of lever 30 in a depressed position, bar 17 is in a raised position and consequently its arcuate clamping arms 24 and 25 are correspondingly raised relative to respective horizontally alined hooks. In such position of the clamping arms, the several grease guns mounted on companion hooks may be selectively removed. Where, however, the manipulating portion 36 is elevated, lever 30 pivots or tilts relative to yoke 31 or the panel and its opposing pivoted portion 29 bodily moves the guided bar 17 downwardly. Hence curved arms 24 and 25 move in unison downwardly firmly gripping and clamping the upper parts of the body of the several grease guns mounted on the several rows of alined hooks.

In the raised position of the manipulating portion 36 of lever 30, bar 17 is in a lowered position and consequently the several grease guns are locked, thus preventing unauthorized removal thereof from the panel. To prevent displacement of the bar in its lowered position, the hasp 38 of a padlock 37 may be disconnectably interlocked with the spaced perforated ears 39 and 40 fixedly carried respectively by the panel and the manipulating portion of the lever, hence it is appreciated, that with the bar moved to a position where its curved arms effectively clamp the several grease guns, such position cannot be disturbed unless the padlock 37 is disconnected from the pair of perforated ears 39 and 40, at which time, lever 30 may be again manipulated to raise the central bar, permitting ready access to the grease guns to permit their removal from the panel.

Without further analysis, the foregoing disclosure will so fully reveal the gist of the present invention that others can by applying current knowledge readily adapt it for various applications without omitting certain features, that from the standpoint of the prior art, fairly constitute the essential characteristics of the generic and specific aspect of the invention and therefore such adaptations should and are intended to be comprehended within the meaning and range of equivalency of the following claims.

I claim:

1. In a rack, the combination of, a panel having a plurality of rows of alined hooks, a slidable member common to said rows and intermediately disposed between the hooks of the several rows, spaced blocks carried by said panel defining vertically spaced gaps in registration for slidably guiding said member, brace means abutting said blocks to prevent transverse displacement of said member, said member bodily carrying a plurality of arms adapted to frictionally clamp articles supported by the several rows of said hooks, and tiltable means pivotally connected to said member for slidably displacing the latter relative to said panel.

2. In a rack, the combination of, a panel having a plurality of rows of alined hooks, a slidable member common to said rows and intermediately disposed between the hooks of the several rows, spaced blocks carried by said panel defining vertically spaced gaps in registration for slidably guiding said member, brace means abutting said blocks to prevent bodily transverse displacement of said member, a plurality of arcuately arranged arms bodily carried by said member and each adapted to frictionally clamp the articles supported by said rows, an intermediately pivoted lever pivotally connected to said member for slidably actuating the latter, and locking means to prevent displacement of said lever.

3. In a rack, the combination of, a panel having a plurality of spaced pairs of alined hooks, each pair adapted to removably support an article, a slidable bar common to said pairs and interposed between the hooks thereof, spaced blocks carried by said panel defining vertically spaced gaps in registration for slidably guiding said bar, brace means interconnecting said blocks to prevent transverse displacement of said bar, a plurality of arcuate arms bodily carried by said bar and adapted to frictionally engage and clamp an article supported by each of said pairs, a pivoted lever having a pivoted connection with said bar for actuating the latter to simultaneously lower or raise said plurality of arcuate arms, and locking means to prevent displacement of said lever.

4. In a rack, the combination of, a panel having a plurality of spaced pairs of alined hooks, each pair adapted to removably support an article, a slidable bar common to said pairs and interposed between the hooks of said pairs, spaced blocks carried by said panel defining vertically spaced gaps in registration for slidably guiding said bar, brace means interconnecting said blocks to prevent transverse displacement of said bar, a plurality of arcuate downwardly facing arms bodily carried by said bar and adapted to frictionally engage and removably clamp the article supported by each of said pairs, a yoke secured to said panel, a lever having its intermediate portion pivotally carried by said yoke, an offset lug secured to said bar, said lever having a portion pivotally interposed between said lug and bar, and locking means to prevent displacement of said lever relative to said bar.

5. In a rack, the combination of, a panel having a plurality of spaced pairs of alined hooks, each pair adapted to removably support an article, a slidable bar common to said rows and interposed between the hooks of said pairs, horizontally spaced blocks carried by said panel defining vertically spaced gaps in registration for slidably guiding said bar, brace means interconnecting said spaced blocks to prevent transverse displacement of said bar relative to said panel, a plurality of complementally curved arms bodily carried by said bar and adapted to frictionally engage and removably clamp articles supported by said pairs, a yoke secured to said panel comprising spaced lugs, a lever having its intermediate portion pivoted between said lugs, an offset lug carried by said bar, said lever having a portion pivoted between said bar and offset lug, said lever having an offset manipulating portion spaced from said panel, said lever being tiltable upon application of pressure on said manipulatable portion to displace said bar for bodily moving said arms towards or away from the articles supported by said pairs of hooks.

6. In a rack, the combination of, an elongated panel having a plurality of spaced pairs of alined hooks, each pair adapted to removably support a grease gun, a slidable bar common to said pairs and centrally interposed between the hooks thereof, a plurality of pairs of spaced blocks carried by said panel defining vertically disposed gaps in registration for vertically slidably guiding said bar, brace means interconnecting each pair of said blocks to prevent transverse bodily displacement of said bar, a plurality of spaced arcuate downwardly facing arms bodily carried by said bar and adapted to frictionally engage and removably clamp a grease gun supported by each of said pairs, a yoke secured to said panel comprising spaced lugs, a lever having its intermediate portion pivoted between said lugs, an offset lug carried by said bar, said lever having a portion pivoted between said bar and offset lug, said lever having an offset manipulating portion spaced from said panel, said lever being tiltable upon application of pressure on said manipulatable portion to displace said bar for bodily and simultaneously moving said arms towards or away said guns supported by said pairs, and means to lock said lever to prevent displacement of said bar.

CARL FISCHER.